(12) United States Patent
Seidler et al.

(10) Patent No.: US 9,783,130 B2
(45) Date of Patent: Oct. 10, 2017

(54) INTERIOR TRIM COMPONENTS WITH INTEGRATED ELECTRICAL WIRING

(71) Applicant: Delphi Technologies, Inc., Troy, MI (US)

(72) Inventors: Robert J. Seidler, Warren, OH (US); Gerald A. Rhinehart, Jr., Lordstown, OH (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 0 days.

(21) Appl. No.: 14/955,139

(22) Filed: Dec. 1, 2015

(65) Prior Publication Data
US 2017/0151915 A1    Jun. 1, 2017

(51) Int. Cl.
*H01R 13/02* (2006.01)
*B60R 13/02* (2006.01)
*B60R 16/02* (2006.01)

(52) U.S. Cl.
CPC .......... *B60R 13/02* (2013.01); *B60R 16/0207* (2013.01)

(58) Field of Classification Search
CPC ....... B60R 13/02; B60R 16/0207; H01R 4/60; H01R 13/64
USPC .................................. 439/212, 213, 34, 210
See application file for complete search history.

(56) References Cited

U.S. PATENT DOCUMENTS

| | | | |
|---|---|---|---|
| 5,848,902 A | 12/1998 | Yamaguchi et al. | |
| 6,036,501 A * | 3/2000 | Wojewnik | B60R 16/0207 439/34 |
| 6,142,556 A * | 11/2000 | Tanaka | B60R 16/0222 174/72 A |
| 6,203,343 B1 * | 3/2001 | Chevassus-More | B60R 16/0207 174/72 B |
| 6,273,499 B1 * | 8/2001 | Guyon | B60R 16/0215 174/72 A |
| 6,371,548 B1 * | 4/2002 | Misaras | B60N 2/466 174/72 A |
| 6,494,522 B1 * | 12/2002 | Drewniok | B60R 16/0207 296/146.7 |
| 6,565,142 B1 * | 5/2003 | Gibney, Jr. | B60R 13/0243 296/146.5 |
| 6,884,084 B2 * | 4/2005 | Shields | H02G 3/00 296/214 |
| 7,192,076 B2 * | 3/2007 | Ottino | B60J 5/0416 296/146.1 |
| 7,614,895 B2 * | 11/2009 | Jur | H01R 25/162 439/108 |
| 8,733,828 B2 * | 5/2014 | VanHouten | B60R 13/0212 296/210 |

(Continued)

FOREIGN PATENT DOCUMENTS

JP    2005302671 A    10/2005
WO    0112471 A1    2/2001

*Primary Examiner* — Alexander Gilman
(74) *Attorney, Agent, or Firm* — Robert J. Myers

(57) ABSTRACT

An interior trim component configured for use in a vehicle including a housing formed of a dielectric material and an electrical conductor encased within the housing being surrounded by and in intimate contact with the dielectric material forming the housing. The electrical conductor defines two exposed contact points. An exterior surface of the housing has a desired trim color and desired trim texture. The trim component may be manufactured using a 3D printing process or an insert molding process.

5 Claims, 2 Drawing Sheets

(56) References Cited

U.S. PATENT DOCUMENTS

| | | | |
|---|---|---|---|
| 8,900,002 B2* | 12/2014 | Mooney | H02G 5/007 |
| | | | 439/212 |
| 9,241,415 B2* | 1/2016 | Quinn | B60R 16/0207 |
| 9,386,693 B2* | 7/2016 | Gruhl | H05K 1/0284 |
| 9,455,530 B2* | 9/2016 | Patel | H01R 13/652 |
| 2004/0055153 A1* | 3/2004 | Zahradnik | B60R 16/0207 |
| | | | 29/846 |
| 2007/0091626 A1 | 4/2007 | Hook | |
| 2013/0119691 A1 | 5/2013 | DeLine et al. | |
| 2015/0201499 A1* | 7/2015 | Shinar | H05K 3/125 |
| | | | 425/132 |
| 2017/0151916 A1 | 6/2017 | Tsunoda et al. | |

* cited by examiner

INTERIOR TRIM COMPONENTS WITH INTEGRATED ELECTRICAL WIRING

TECHNICAL FIELD OF THE INVENTION

The invention relates to interior trim components for vehicles, particularly trim components with integrated electrical wiring.

BACKGROUND OF THE INVENTION

Electrical wiring harnesses within the interior compartment (cockpit) of a vehicle are often covered by trim components, often referred to as trimpieces, having a desired color, shape, and texture on the exterior surface to provide an aesthetically pleasing appearance within the interior compartment. For example, wiring harness connecting lights, switches, and motors located above the vehicle headliner to the vehicle's electrical system are typically routed through the roof pillars. Trimpieces are attached to the roof pillars to hide the wiring harness from view of vehicle occupants. Another example is a trimpiece used to hide the wiring harness connection electrical devices in the rear view mirror to the vehicle's electrical system.

The wiring harnesses is first connected to the mating connectors in the vehicle and then the trimpiece is attached to the vehicle, thereby covering the wiring harness. This requires at least two separate labor steps by an assembly operator.

Vibration of the vehicle could cause the wiring harness to rattle against the trimpiece causing customer dissatisfaction and a reduction in wiring harness reliability, either of which could result in warranty repair claims for the vehicle manufacturer and suppliers. Additional countermeasures such as wire harness retaining clips and/or sound insulation on the inside surface of the trimpiece in order to avoid rattling may be required. Wiring and trim components that can avoid these assembly and rattle issues are desired.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with an embodiment of the invention, an interior trim component configured for use in a vehicle is provided. The interior trim component includes a housing formed of a dielectric material and an electrical conductor encased within the housing being surrounded by and in intimate contact with the dielectric material forming the housing. The electrical conductor defines two exposed contact points.

The electrical conductor may be formed of a metallic material. The interior trim component may be formed by insert molding the electrical conductor within the interior trim component. Alternatively, the interior trim component may be formed by a 3D printing process depositing the dielectric material forming the housing and depositing a conductive material forming the electrical conductor.

The interior trim component may include a number of metallic electrical conductors. In this case, each conductor is encased within the housing and is surrounded by and in intimate contact with the dielectric material forming the housing and each electrical conductor defines two exposed contact points.

An exterior surface of the housing may have a desired trim color and desired trim texture.

The interior trim component may be configured to interconnect a rear view mirror to a vehicle electrical system.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Figure 1:
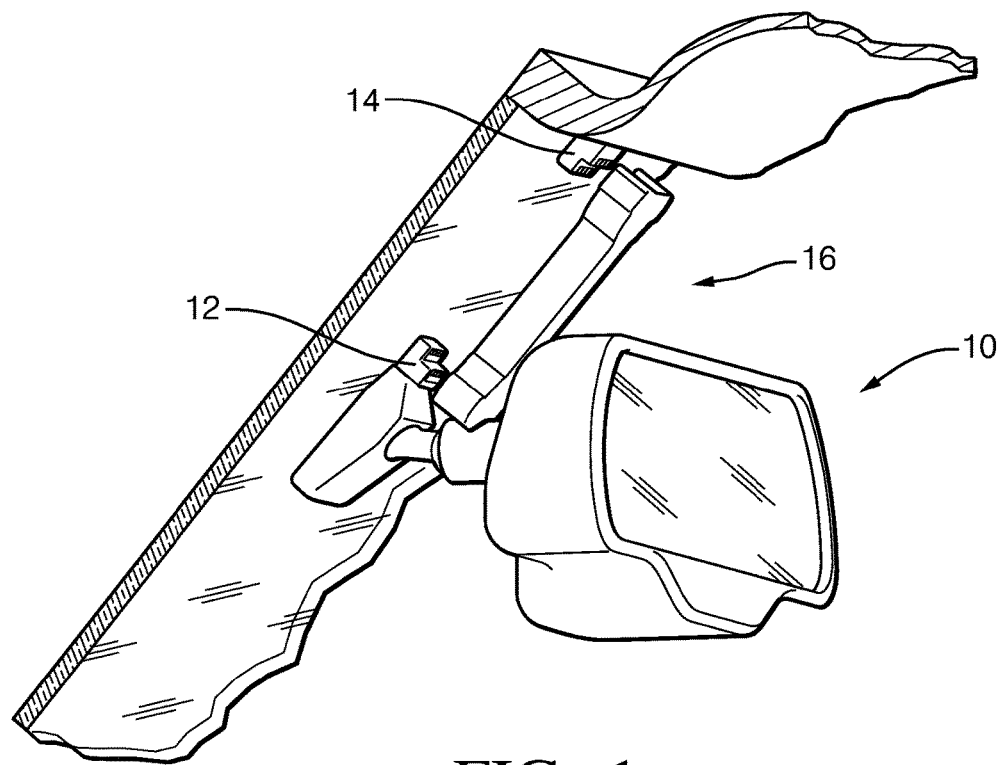
FIG. 1 is a perspective view of an interior trim components with integrated electrical wiring connecting a rear view mirror assembly to a vehicle electrical connector according to one embodiment.

FIG. 1 illustrates a non-limiting example of a rear view mirror assembly, hereinafter referred to as the mirror 10. Mirrors in modern vehicles may include a wide variety of electrical and electronic components including, but not limited to, lights, switches, electrochromatic glass and light sensors for auto-dimming, and rear view camera displays. Therefore, in order to supply electrical power and signals from the vehicle's electrical wiring system to the mirror 10, a mirror electrical connector 12 is connected to a vehicle electrical connector 14 by an interior trim component with integrated electrical wiring, hereinafter referred to as a trimpiece 16.

Any number of attachment features known to those skilled in the art, such as snap locks or threaded fasteners, may be employed to attach the trimpiece 16 to the mirror connector 12 and vehicle connector 14. The type of attachment feature selected may be dependent on the size constraints of the connectors and trimpiece 16 as well as ergonomic requirements of the assembly process of attaching the trimpiece 16 to the connectors.

Figure 2:
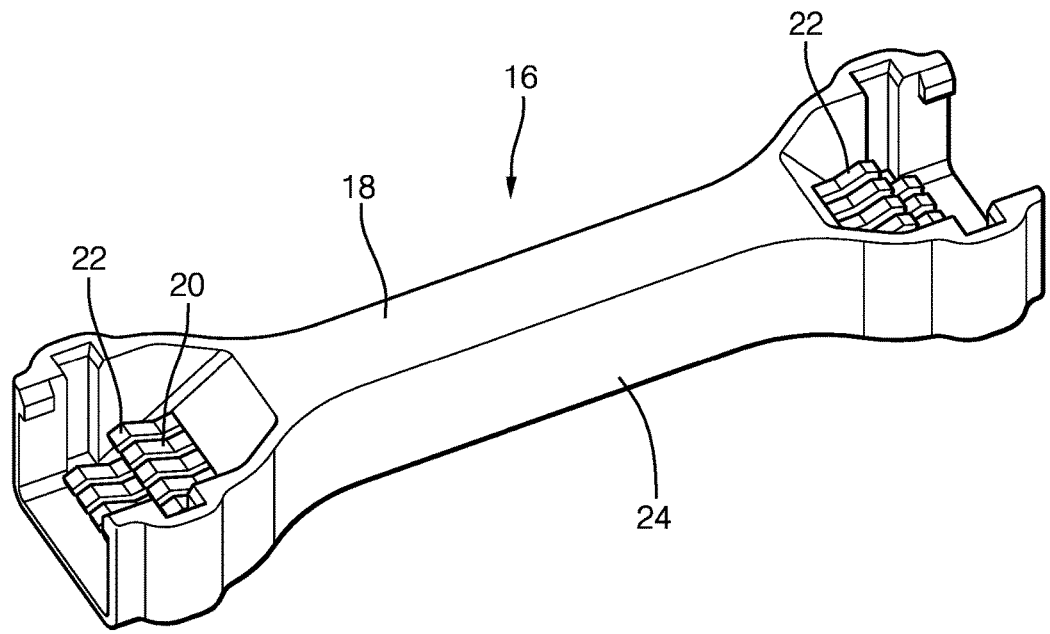
FIG. 2 is a perspective view of the interior trim component of FIG. 1 according to one embodiment.

As shown in the non-limiting example of FIG. 2, the trimpiece 16 includes an enclosure or housing 18 that is formed of a dielectric, or electrically insulating, material such as acrylonitrile butadiene styrene (ABS) or polyamide (PA), commonly referred to as NYLON. The housing 18 encloses a number of electrical conductors 20 formed of an electrically conductive material, such as copper or aluminum based materials. The material forming the housing 18 surrounds and intimately contacts the conductive material forming the conductors 20. The housing 18 provides electrical insulation for the electrical conductors 20. Each conductor has two exposed contact points 22, one on each end of the conductor, that are configured to interface with the mirror and vehicle connectors 12, 14. The housing 18 also provides proper dimensional spacing and location for the electrical conductors 20 and contact points 22 for proper mating with the vehicle and mirror connectors 12, 14.

Figure 3:
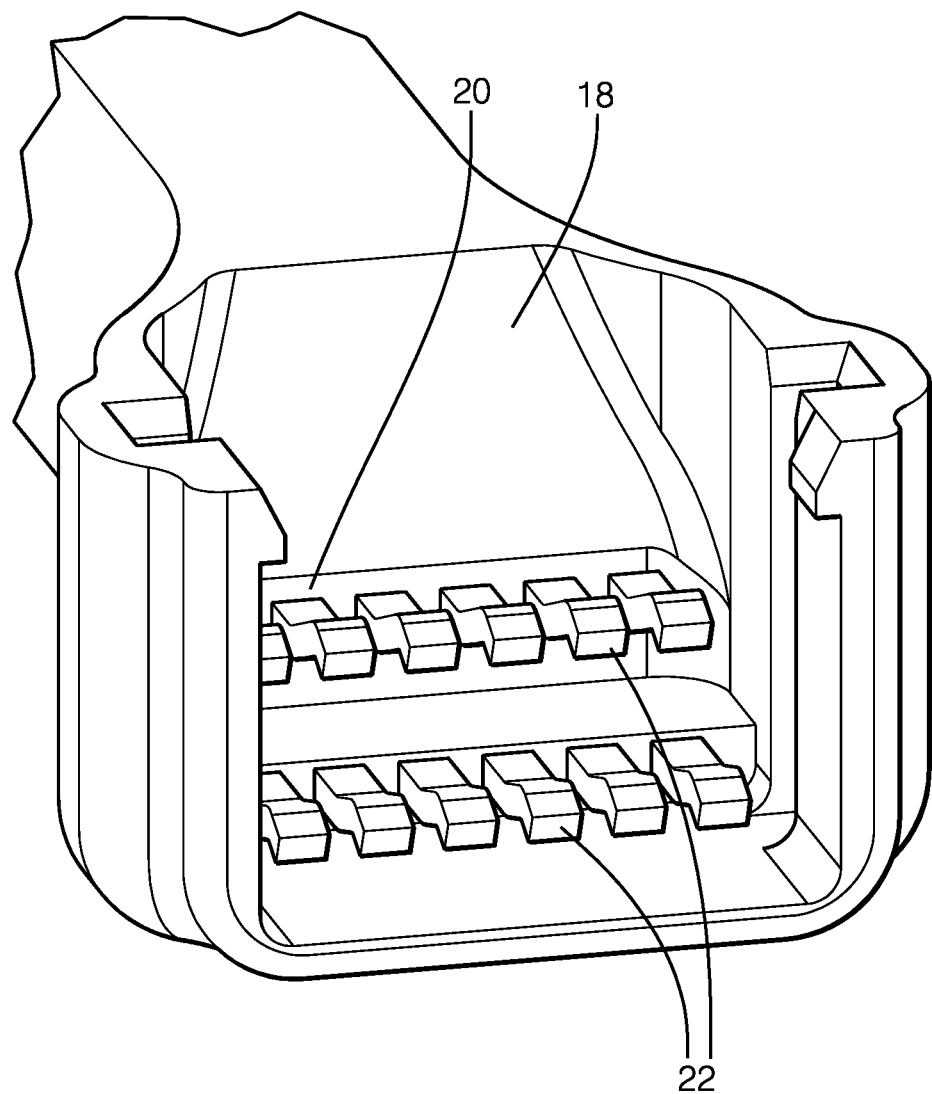
FIG. 3 is a close up perspective view of the contact points of the interior trim component of FIG. 1 according to one embodiment.

As shown in FIG. 3, each of the contact points 22 are curved to provide a spring force for the contact points 22 against the mating contact points 22 of the vehicle and mirror connectors 12, 14. Alternatively, the contact points may comprise male pin or blade terminals configured to interface with mating female terminals in the vehicle and mirror connectors 12, 14 or any other type of suitable electrical contact known to those skilled in the art.

The trimpiece 16 may be integrally formed using a 3D printing process capable of deposition of both dielectric and conductive materials, such as the process described by Shinas, et al. in U.S Patent Publication No. 2015/0201499 entitled DEVICE, SYSTEM, AND METHOD OF THREE-DIMENSIONAL PRINTING. The electrical conductors 20 and contact points 22 can be printed and integrated into the trimpiece 16 during the 3D printing process. The conductors 20 can also be layered and formed in any shape required for packaging.

Alternatively, the conductors 20 may be formed by stamping from a sheet of conductive material and then placed in a mold and insert molded within the housing 18 using an injection molding process.

The housing 18 may be formed so that an exterior surface 24 of the trimpiece 16 has a desired trim color and trim texture to match or compliment other interior trim components.

While the illustrated example of the trimpiece 16 is used to connect a mirror 10 to the vehicle electrical system, other embodiments of the trim piece may be used in other interior application, for example a roof pillar trimpiece that is used to connect the wiring in the vehicle headliner to the vehicle's' electrical system. Other embodiments may include structural elements formed of a dielectric material similarly encasing electrical conductors.

The trimpiece 16 described herein provides the benefits of reducing assembly time since making electrical connections and installing a trimpiece can be accomplished in a single operation rather than two separate operations of connecting a separate wiring harness and installing a separate trimpiece as was required previously. The trimpiece 16 also provides the benefit of eliminating rattles that could previously occur if a separate wiring harness contacted an interior surface of a separate trimpiece due to vibration. Producing the trimpiece 16 using 3D printing methods would further provide the benefits of a reduction in part numbers, tooling and labor costs.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. An interior trim component configured for use in a vehicle, comprising:
a housing formed of a dielectric material; and
a plurality of metallic electrical conductors, wherein each electrical conductor of the plurality of metallic electrical conductors is encased within the housing and is surrounded by and in intimate contact with the dielectric material forming the housing, wherein each electrical conductor of the plurality of metallic electrical conductors defines two contact points exposed external to the housing, and wherein an exterior surface of the housing has a desired trip color and desired trim texture..

2. The interior trim component according to claim 1, wherein the interior trim component is formed by insert molding the plurality of metallic electrical conductors within the interior trim component.

3. The interior trim component according to claim 1, wherein the interior trim component is formed by a 3D printing process depositing the dielectric material forming the housing and depositing a conductive material forming the plurality of metallic electrical conductors.

4. The interior trim component according to claim 1, wherein the interior trim component is configured to interconnect a windshield mounted rear view mirror to a vehicle electrical system.

5. The interior trim component according to claim 1, wherein the interior trim component is a roof pillar trimpiece configured to interconnect a wiring in the vehicle's headliner to a vehicle electrical system.

* * * * *